US007730419B2

(12) United States Patent
Schneider

(10) Patent No.: US 7,730,419 B2
(45) Date of Patent: *Jun. 1, 2010

(54) COMMUNICATION BETWEEN BROWSER WINDOWS

(75) Inventor: Haim Schneider, Ramot Meir (IL)

(73) Assignee: International Business Machines Corporation, Armonk, NY (US)

(*) Notice: Subject to any disclaimer, the term of this patent is extended or adjusted under 35 U.S.C. 154(b) by 122 days.

This patent is subject to a terminal disclaimer.

(21) Appl. No.: 12/172,489

(22) Filed: Jul. 14, 2008

(65) Prior Publication Data

US 2008/0295024 A1 Nov. 27, 2008

Related U.S. Application Data

(63) Continuation of application No. 11/101,082, filed on Apr. 7, 2005, now Pat. No. 7,426,699.

(30) Foreign Application Priority Data

Apr. 8, 2004 (GB) .................................. 0407977.8

(51) Int. Cl.
G06F 3/048 (2006.01)
G06F 3/00 (2006.01)
G06F 15/16 (2006.01)
G06F 15/173 (2006.01)

(52) U.S. Cl. ................ 715/804; 715/733; 715/745; 709/204; 709/223; 719/313; 719/329

(58) Field of Classification Search ................ 715/804, 715/733, 745; 709/204, 223; 719/313, 329
See application file for complete search history.

(56) References Cited

U.S. PATENT DOCUMENTS

| 6,298,356 | B1 | 10/2001 | Jawahar et al. |
| 2002/0010776 | A1 | 1/2002 | Lerner |
| 2002/0054139 | A1 | 5/2002 | Corboy et al. |
| 2003/0037131 | A1 | 2/2003 | Verma |

*Primary Examiner*—Ting Lee
(74) *Attorney, Agent, or Firm*—Daniel McLoughlin; Hoffman Warnick LLC

(57) ABSTRACT

A system for communication between browser windows includes a first web page configured to enable a first browser window into which the first web page is loaded to write a first message into a cookie; a second web page configured to enable a second browser window into which the second web page is loaded to retrieve the first message from the cookie; wherein the second web page is configured to enable the second browser window into which the second web page is loaded to write a second message into a the cookie; and wherein the first web page is configured to enable the first browser window into which the first web page is loaded to retrieve the second message from the cookie.

4 Claims, 4 Drawing Sheets

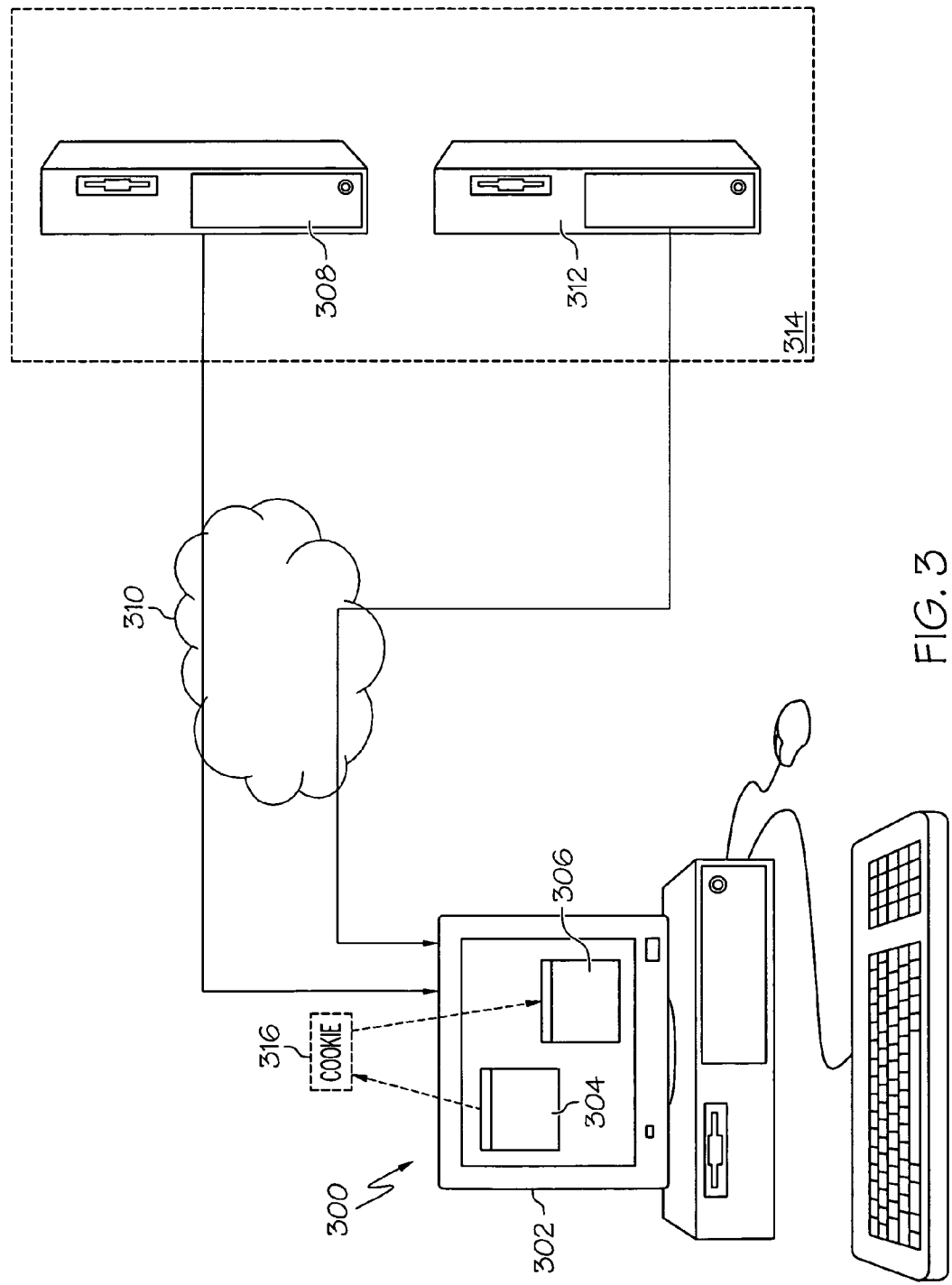

us 7,730,419 B2

COMMUNICATION BETWEEN BROWSER WINDOWS

CROSS-REFERENCE TO RELATED APPLICATIONS

This application is a Continuation application of patent application Ser. No. 11/101,082, filed Apr. 7, 2005, now U.S. Pat. No. 7,426,699 entitled "Communication Between Browser Windows," which is hereby incorporated by reference.

FIELD OF THE INVENTION

The present invention relates to computer-based inter-window communications in general, and more particularly to communication between web-page browser windows.

BACKGROUND OF THE INVENTION

Network-based applications that run within web-page browser windows (thin clients) often have inferior user interfaces as compared to native applications that interface directly with the computer operating system (fat clients). In general, native applications have much richer and more responsive user interfaces than do applications that run within browser windows. This is mainly due to limitations that browsers impose on browser-based applications. One of the most significant of these limitations is the lack of a simple and reliable method for communicating between browser windows. To avoid this problem, browser-based applications often operate within the confines of a single window, whereas native applications often provide users with multiple views in multiple windows. As a result, users of browser-based applications often have to navigate between different web pages in order to switch views, which is a time-consuming action.

One method that may be used to provide for communication between browser windows employs JavaScript™ window handles. In this method, when a window B is opened by another window A using a JavaScript command, JavaScript code in both windows A and B can get a handle to the other window and use the handle for direct function calls between the two windows. However, this type of communication is only possible where window B is opened by a JavaScript call or by a HyperText Mark-up Language (HTML) link that is configured to open a new browser window when selected. Thus, if window B is opened from the browser menu, JavaScript cannot be used in either window to get the other window's handle. This type of communication is also limited to communication between browser windows displaying web pages from the same host. Thus, a network-based application having multiple browser windows, each displaying a web page from a different host in the same domain, cannot use this technique to allow its browser windows to communicate with one another.

Another method that may be used to provide for communication between browser windows employs Java™ applets. In this method, multiple instances of a Java applet that reside in different browser windows can communicate with each other using static data members and static methods. Thus, web pages residing in different browser windows that each include an instance of the same Java applet can communicate with each other via inter-applet communication (e.g., Window A JavaScript to Window A applet→Window A applet to Window B applet→Window B applet to Window B JavaScript). However, this method requires that the browser have a Java Virtual Machine (JVM), whereas recent versions of popular browsers do not include a JVM by default.

SUMMARY OF THE INVENTION

The present invention discloses a system and method for communication between web-page browser windows where cookies are used to pass information between browser windows. Since browser windows running under the same process share the same cookie space, web pages from the same domain that reside in separate browser windows running under the same process can read from and write to the same cookie. Thus, a web page in window A may send a message to a web page in window B by writing the message to a cookie. Window B may then read the cookie to get the message.

The present invention seeks to allow communication between browser windows:
 (a) between application pages from different hosts in the same domain;
 (b) whether they were opened using JavaScript, by the selection of an HTML link, or from the browser's menu;
 (c) that is not affected by browser navigation; and
 (d) that does not require a Java Virtual Machine.

In one aspect of the present invention there is provided a system for communication between browser windows, the system comprising: at least one computer, including: a first web page configured to enable a first browser window into which the first web page is loaded to write a first message into a cookie; a second web page configured to enable a second browser window into which the second web page is loaded to retrieve the first message from the cookie; wherein the second web page is configured to enable the second browser window into which the second web page is loaded to write a second message into a the cookie; and wherein the first web page is configured to enable the first browser window into which the first web page is loaded to retrieve the second message from the cookie; and a system for preventing a collision when the first browser window and the second browser window attempt to write to the cookie at the same time, the preventing comprising: the first browser window reading the cookie to determine if the first message has been written to the cookie, and if not, waiting a period of time before again attempting to write the first message to the cookie; and the second browser window reading the cookie to determine if the second message has been written to the cookie, and if not, waiting a period of time before again attempting to write the second message to the cookie In another aspect of the present invention there is provided a computer program stored on a computer-readable storage medium, the computer program comprising: a code segment operative to enable a first browser window into which a first web page is loaded to write a first message into a cookie; a code segment operative to enable a second browser window into which a second web page is loaded to retrieve the first message from the cookie; a code segment operative to enable the second browser window into which the second web page is loaded to write a second message into the cookie; a code segment operative to enable the first browser window into which the first web page is loaded to retrieve the second message from the cookie; and a code segment operative to prevent a collision when the first browser window and the second browser window attempt to write to the cookie at the same time, the preventing comprising: the first browser window reading the cookie to determine if the first message has been written to the cookie, and if not, waiting a period of time before again attempting to write the first message to the cookie; and the second browser window reading the cookie to determine if the second message has been written to the cookie, and if not, waiting a period of time before again attempting to write the second message to the cookie It is appreciated throughout the specification and claims that references to the actions of a web page may be understood in the context of the actions of a browser window into which the web page has been loaded, and that references to the actions of a browser window may be understood in the context of a web page that has been loaded into the browser window and configured to enable the browser window to perform specific actions.

BRIEF DESCRIPTION OF THE DRAWINGS

The present invention will be understood and appreciated more fully from the following detailed description taken in conjunction with the appended drawings in which:

FIG. 3 is a simplified pictorial illustration of a computer-based system in which the method of FIG. 1 may be implemented, constructed and operated in accordance with a preferred embodiment of the present invention

DETAILED DESCRIPTION OF THE INVENTION

Figure 1:
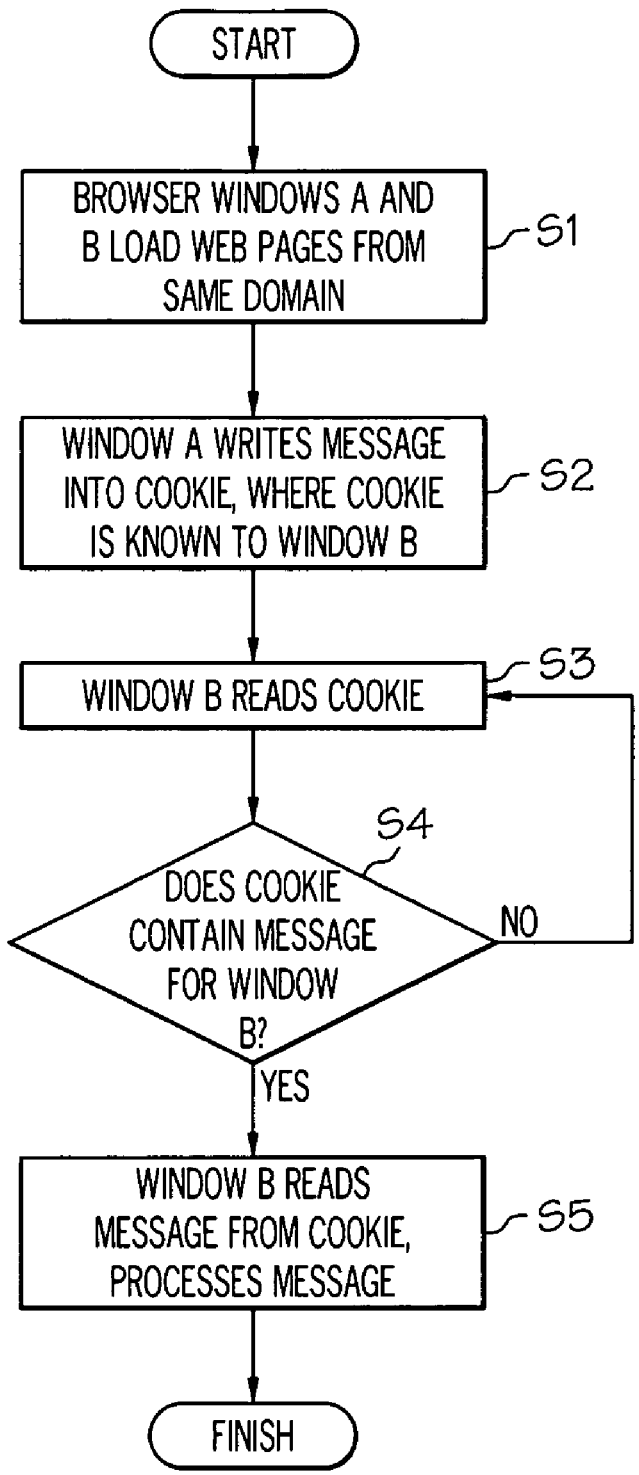
FIG. 1 is a simplified flowchart illustration of a method for communication between web-page browser windows, operative in accordance with a preferred embodiment of the present invention.

Reference is now made to FIG. 1, which is a simplified flowchart illustration of a method for communication between web-page browser windows, operative in accordance with a preferred embodiment of the present invention. In the method of FIG. 1, each of two or more browser windows running on a computer, preferably concurrently and under the same process, is used to retrieve a web page. Typically, each browser window retrieves and renders a different web page from different hosts in the same domain (step S1). For example, a first browser window A retrieves and renders a web page named "page1.html" from a first host named "host1" at the domain "mydomain.com," whose full Universal Resource Locator (URL) is "http://host1.mydomain.com/page1.html," while a second browser window B retrieves and renders a web page named "page2.html" from a second host named "host2" at the same domain, whose full URL is "http://host2.mydomain.com/page2.html."

The web pages retrieved and rendered by windows A and B are preferably configured to enable windows A and B to behave as follows. To send a message to window B, the web page residing in window A writes the message, such as by using JavaScript commands, into a cookie C whose name is known in advance to the web page residing in window B (step S2). Window B reads cookie C, preferably periodically, such as every 100 milliseconds (step S3), and such as by using JavaScript commands, to determine if another window has sent window B a message. If cookie C contains a message for window B (step S4), window B retrieves the information for processing (step S5).

Cookie C may be an ephemeral cookie, also commonly referred to as a temporary cookie, which is only stored in a memory space accessible to the browser window and which disappears when the user exits the browser, or a persistent cookie that is stored on the user's hard disk. A single cookie may be used for either one-way or two-way communications between browser windows, such as where the identity of the sending window (sender) and/or the identity of the receiving window (receiver) are indicated within the cookie in association with the information being sent. Additionally or alternatively, each sender may use a separate cookie, where each sender writes its messages to the cookie assigned to it, and the receivers periodically read the values of all the sender cookies whose names are known in advance to the receivers. A cookie may be separated into sections for each sender using any known section separation technique, with each sender writing messages into its section. When a sender wants to send a message, it reads the cookie and modifies its section to include its message. Additionally or alternatively, a cookie may be separated into sections for each receiver using any known section separation technique, with each sender writing messages into the section corresponding to the intended receiver.

To handle collisions, when two or more senders try to write to a cookie at the same time, each sender preferably verifies that its message was actually written by reading the value of the cookie immediately after it writes to the cookie and checking if the message has been written. If the message was not written, the sender preferably waits a predefined or random period of time, such as by using the JavaScript setTimeout function, before again attempting to write to the cookie.

Figure 2A:
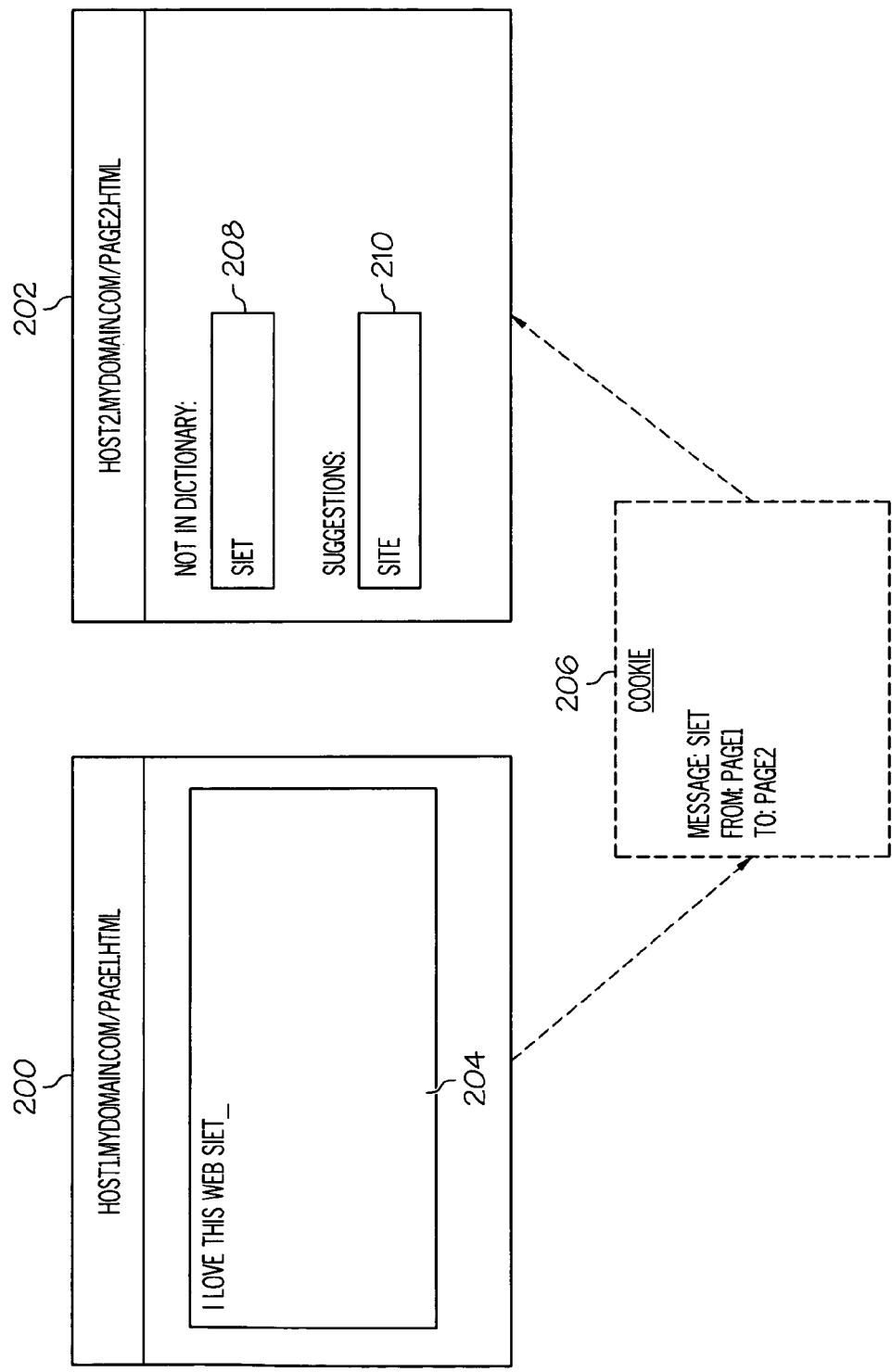
FIGS. 2A-2B are simplified pictorial illustrations of an exemplary implementation of the method of FIG. 1.
Figure 2B:
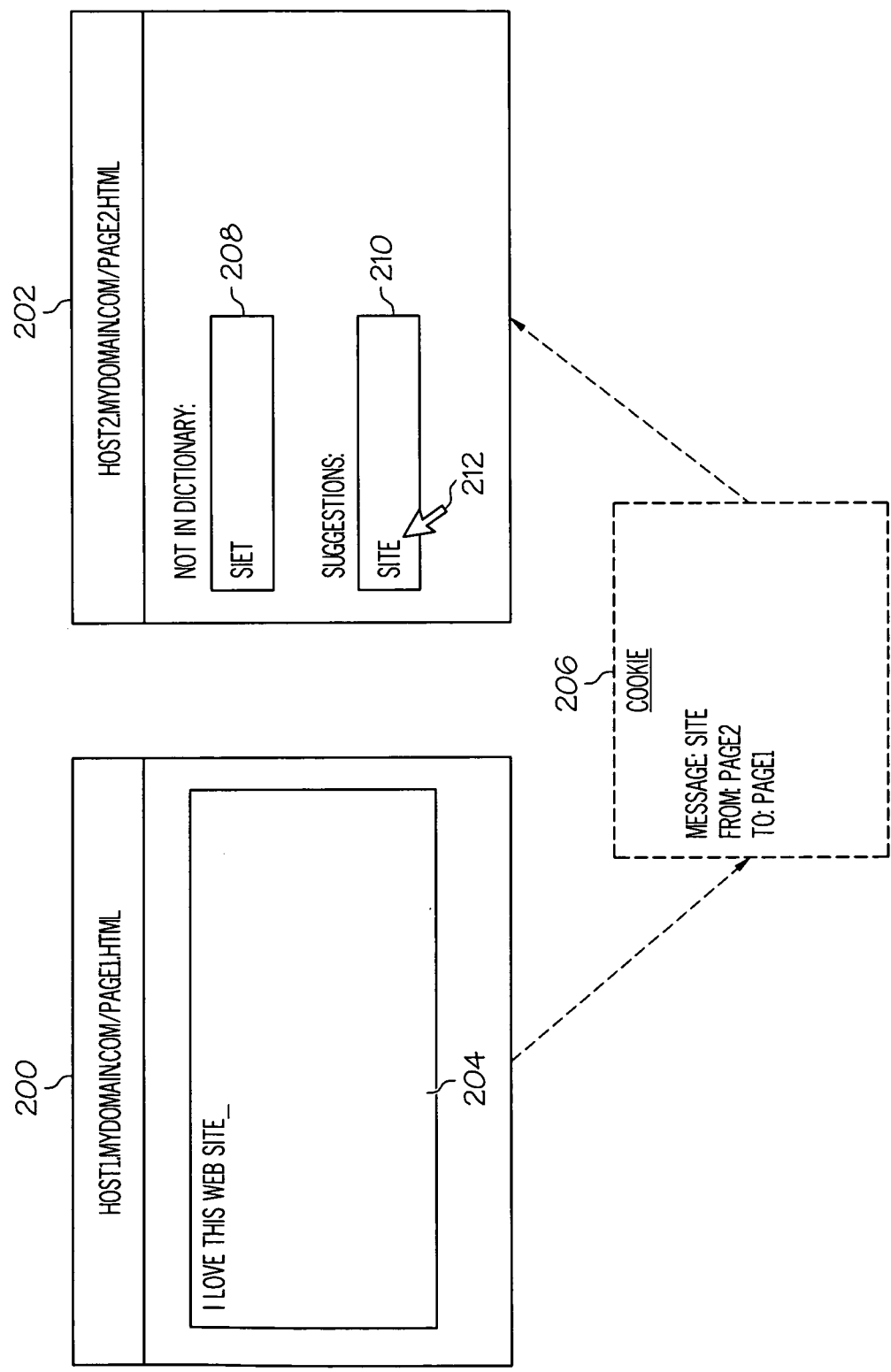

Reference is now made to FIGS. 2A-2B, which are simplified pictorial illustrations of an exemplary implementation of the method of FIG. 1. In FIG. 2A, a browser window 200 is shown in which a web page retrieved from "http://host1.mydomain.com/page1.html" resides. A browser window 202 running under the same process as window 200 is also shown in which a web page retrieved from "http://host2.mydomain.com/page2.html" resides. As both browsers are running under the same process, and as both web pages are from different hosts in the same domain, windows 200 and 202 share the same cookie space. In window 200 a textbox 204 is shown in which a user may enter text. In the example shown, as each word is entered into textbox 204, window 200 writes the recently-entered word into a cookie 206, such as the word "siet." Window 202 periodically checks cookie 206, whose name and message-passing function is known in advance to window 202. The message from window 200 is recognized by window 202 as being meant for it, and the word "siet" is read by window 202. In the example shown, window 202 includes a spelling checker 208 which checks the spelling of "siet" and suggests the correct spelling "site" in a suggestion box 210.

Turning now to FIG. 2B, the user may select the correct spelling within window 202, such as by positioning a cursor 212 over "site" in box 210 and selecting the word using a mouse. Window 202 then writes the selected word into cookie 206, which window 200 likewise periodically checks. The message from window 202 is then recognized by window 200 as being meant for it, and the word "site" is read by window 200 and used in place of the misspelled word.

Reference is now made to FIG. 3, which is a simplified pictorial illustration of a computer-based system in which the method of FIG. 1 and the exemplary implementation in FIGS. 2A-2B may be implemented, constructed and operated in accordance with a preferred embodiment of the present invention. In FIG. 3, a computer display 302 of a computer 300 is shown on which two browser windows 304 and 306 are open. A first web page is downloaded from a first server 308 via a network 310, such as the Internet, and loaded into window 304, while a second web page is downloaded from a second server 312 and loaded into window 306. Both servers 308 and 312 are typically from the same domain 314. The web pages in windows 304 and 306 are configured as described hereinabove with reference to FIGS. 1, 2A, and 2B to enable windows 304 and 306 to write to and read from a cookie 316, which may be stored in a memory space, hard disk, or other storage on computer 300 that is shared by windows 304 and 306.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for communication between browser windows, the system comprising:
    at least one computer, including:
    a first web page configured to enable a first browser window into which the first web page is loaded to write a first message into a cookie;
    a second web page configured to enable a second browser window into which the second web page is loaded to retrieve the first message from the cookie;
    wherein the second web page is configured to enable the second browser window into which the second web page is loaded to write a second message into the cookie; and
    wherein the first web page is configured to enable the first browser window into which the first web page is loaded to retrieve the second message from the cookie; and
    a system for preventing a collision when the first browser window and the second browser window attempt to write to the cookie at the same time, the preventing comprising: the first browser window reading the cookie to determine if the first message has been written to the cookie, and if not, waiting a period of time before again attempting to write the first message to the cookie; and the second browser window reading the cookie to determine if the second message has been written to the cookie, and if not, waiting a period of time before again attempting to write the second message to the cookie.

2. The system according to claim 1, wherein the first and second browser windows run concurrently on a computer under a same process.

3. The system according to claim 1, wherein the first and second browser windows retrieve and render the web pages from different hosts in a same domain.

4. A computer program stored on a computer-readable storage medium, the computer program comprising:
    a code segment operative to enable a first browser window into which a first web page is loaded to write a first message into a cookie;
    a code segment operative to enable a second browser window into which a second web page is loaded to retrieve the first message from the cookie;
    a code segment operative to enable the second browser window into which the second web page is loaded to write a second message into the cookie;
    a code segment operative to enable the first browser window into which the first web page is loaded to retrieve the second message from the cookie; and
    a code segment operative to prevent a collision when the first browser window and the second browser window attempt to write to the cookie at the same time, the preventing comprising: the first browser window reading the cookie to determine if the first message has been written to the cookie, and if not, waiting a period of time before again attempting to write the first message to the cookie; and the second browser window reading the cookie to determine if the second message has been written to the cookie, and if not, waiting a period of time before again attempting to write the second message to the cookie.

* * * * *